F. A. HART.
COMBINED TYPE WRITING AND COMPUTING MACHINE.
APPLICATION FILED OCT. 20, 1911.
1,223,166.
Patented Apr. 17, 1917.
3 SHEETS—SHEET 1.
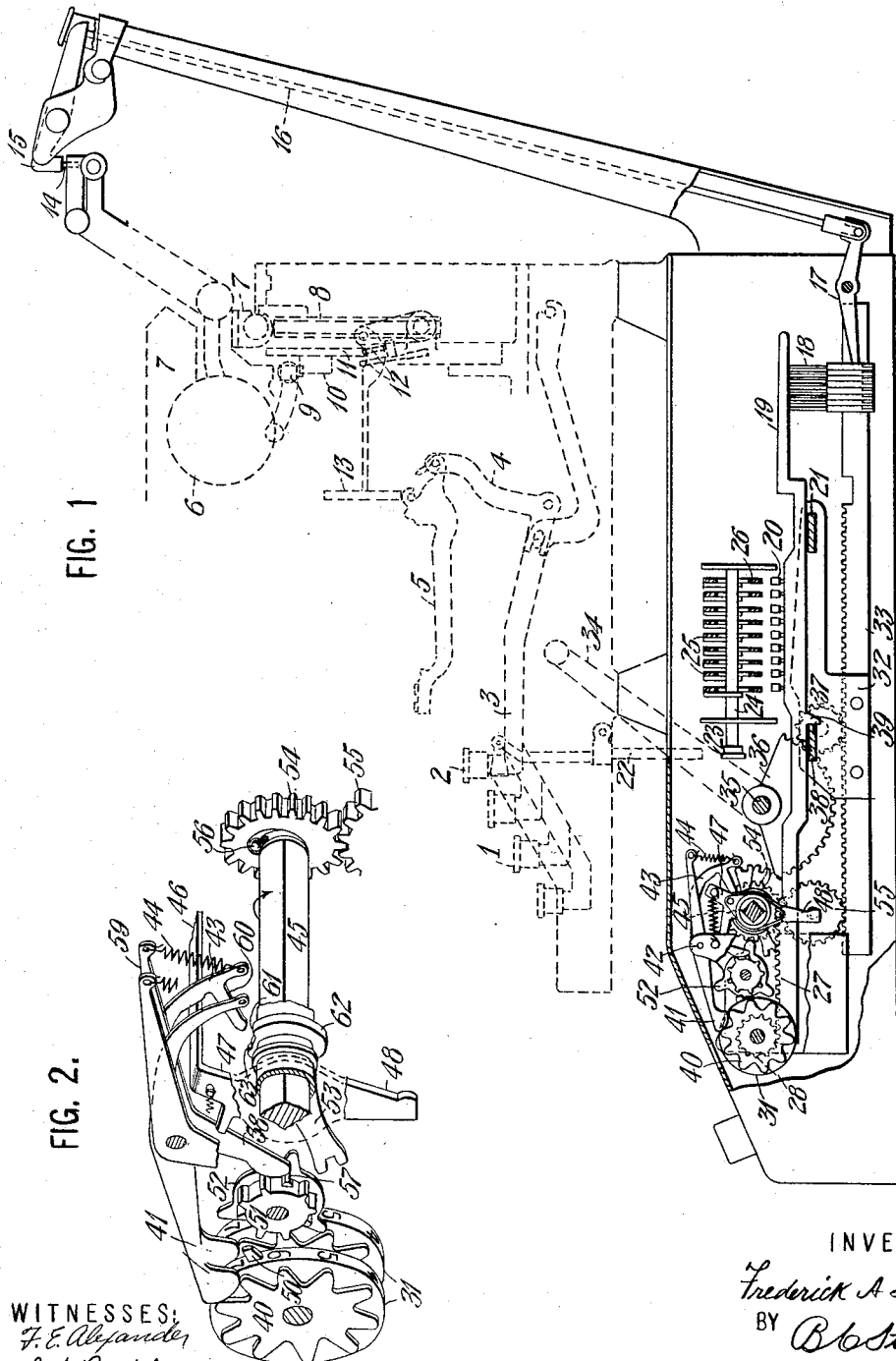
INVENTOR:
Frederick A. Hart
BY
ATTORNEY
WITNESSES:

F. A. HART.
COMBINED TYPE WRITING AND COMPUTING MACHINE.
APPLICATION FILED OCT. 20, 1911.

1,223,166.

Patented Apr. 17, 1917.
3 SHEETS—SHEET 2.

WITNESSES:
F. E. Alexander
J. A. Brophy

INVENTOR:
Frederick A. Hart
BY B. L. Stickney
ATTORNEY

F. A. HART.
COMBINED TYPE WRITING AND COMPUTING MACHINE.
APPLICATION FILED OCT. 20, 1911.

1,223,166.

Patented Apr. 17, 1917.
3 SHEETS—SHEET 3.

WITNESSES:
F. E. Alexander
J. A. Brophy

INVENTOR:
Frederick A Hart
BY
B C Stickney
ATTORNEY

UNITED STATES PATENT OFFICE.

FREDERICK A. HART, OF JERSEY CITY, NEW JERSEY, ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,223,166.  Specification of Letters Patent.  Patented Apr. 17, 1917.

Application filed October 20, 1911. Serial No. 655,680.

*To all whom it may concern:*

Be it known that I, FREDERICK A. HART, a citizen of the United States, residing in Jersey City, in the county of Hudson and State of New Jersey, have invented certain new and useful Improvements in Combined Type-Writing and Computing Machines, of which the following is a specification.

This invention relates to computing machines, particularly to those of the combined typewriting and computing machine type illustrated in the Hanson Patent No. 905,421, in which pins are set by the numeral keys of the typewriter, and subsequently determine the extent to which the dial wheels shall be rotated by the general operator.

It has been usual to provide spring detents for the dial wheels; and, in order to reduce or eliminate the liability of overthrow, the detents have been pressed with great force into the notches provided upon the dial wheels. This construction has a tendency to make it hard to turn the dial wheels, and to render the machine noisy.

One of the principal objects of the present invention is to provide for the easier and quieter rotation of the wheels.

A further object is to provide positively against possible overthrow of any of the dial wheels.

In carrying out the invention, I connect means to the general operator of the machine to temporarily lock all of the dial wheels against overthrow, preferably by moving a locking bar into position to intercept the wheel detents, so that they cannot rise from the notches in the dial wheels.

Another feature of the invention resides in means to prevent overthrow of the dial wheels at the tens-carrying operation, which in said Hanson machine occurs during the return stroke of the general operator. To this end, I provide locks upon the drive shaft of the tens-carrying mechanism, said locks normally out of working positions, but movable into positions to intercept the detents at the completion of the tens-carrying operations, which occur successively upon the dial wheels. Other features and advantages will hereinafter appear.

In the accompanying drawings,

Figure 1 is a sectional side elevation taken about centrally from front to rear of an Underwood combined typewriting and computing machine showing the present improvements applied thereto, with the parts in normal positions.

Fig. 2 is a perspective rear view of certain of the dial wheels and portions of the tens-carrying mechanism and wheel-locking devices.

Figure 4:
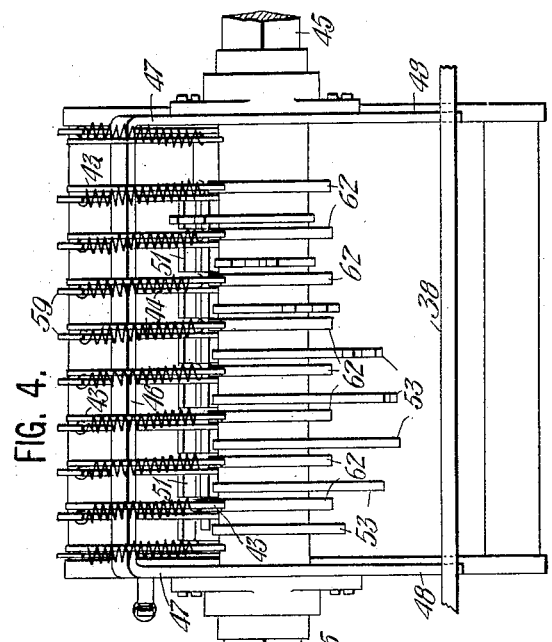
Fig. 4 is a rear elevation of the parts seen at Fig. 3.

In the Underwood combined typewriting and adding machine illustrated in the drawings, alphabet keys 1 and numeral keys 2 operate to depress levers 3 to vibrate bell cranks 4 to swing type bars 5 upwardly and rearwardly against a platen 6, which is mounted on a carriage 7 driven by a spring barrel 8 having a rack 9 to mesh with a pinion 10 connected to an escapement wheel 11, which coöperates with carriage-feeding dogs 12 connected to a universal bar 13 operated by type bars 5.

Upon the carriage is a dog 14 to lift any of a series of jacks 15 to depress any of a series of rods 16 which, by means of levers 17 and linkages 18, are capable of lifting the rear ends of any of a set of computation members or rack bars 19; so that as the carriage 7 progresses, the rack bars 19 are lifted *seriatim*. Each rack bar carries nine computing pins 20, which are depressible to cause them to project below the rack bars 19, to enable the latter to be driven forwardly by means of a horizontal bar 21. The pins 20 are depressed or set by the numeral keys 2, the latter having stems 22 to depress arms 23 on rock shafts 24, which form parts of linkages 25, the latter including horizontal bars 26 extending across the machine in position to depress any pin 20 on any rack bar 19. Thus when the carriage is in the adding zone, some one of the rack bars 19 is always elevated, and hence when any numeral key 2 is depressed, the corresponding pin 20 is pushed down on that rack bar in position to be engaged by the operating bar 21, for turning the computing wheels to corresponding extents.

Figure 3:
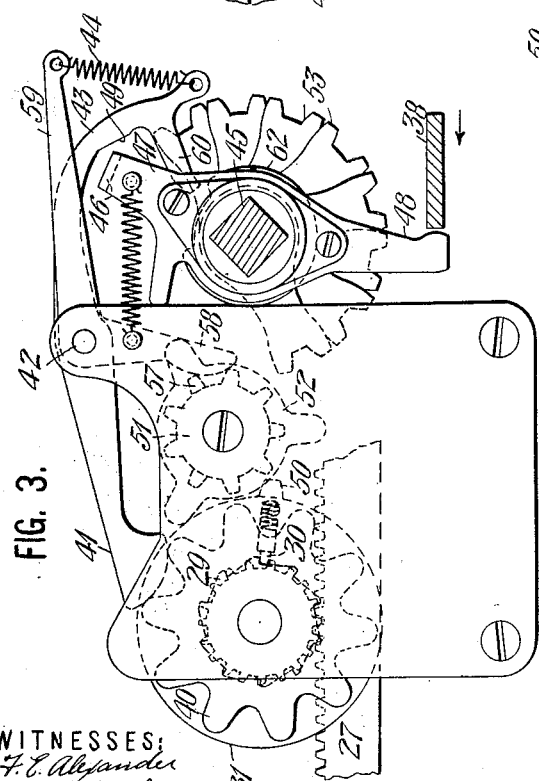
Fig. 3 is a part sectional side elevation on a larger scale of the dial wheels and tens-carrying mechanism, and the wheel-locking devices.

The forward ends of the bars 19 have thereon racks 27 meshing with pinions 28 connected by ratchet wheels 29 and pawls 30 with dial wheels 31, Fig. 3.

The operating bar 21 forms part of a general operating frame, said frame comprising opposite side bars 32 which are connected by said transverse bar 21, said side bars 32 being fixed to opposite rack bars 33, which slide forwardly and backwardly in suitable guides in the framework, being reciprocated by a handle 34 which is provided on a rock shaft 35, to the opposite ends of which are secured segments 36 meshing with pinions 37, the latter meshing with said racks 33; the members 21, 32, 33, 34, 36 and 37 forming a general operator, which is operated by the user of the machine, as soon as the number is set up by depression of keys 2, so that the number which is set up by the pins 21 is carried into the dial wheels 31. When the general operator is returned, a transverse bar 38 thereon engages lugs 39 depending from the rack bars, and restores them to normal positions.

To each dial wheel is fixed a toothed wheel 40, with which engages a detent 41 which is pivoted at 42 upon a fixture, and in rear of the pivots has an arm 43 which is curved downwardly; a spring 44 tending to lift said arm, and hence pressing the detent 41 into a notch in the wheel 40, to position the dial wheel and hold it against displacement. Heretofore, said spring 44 has, in each instance, been made powerful, with a view of preventing overthrow of the dial wheel; but according to the present invention, these springs need not be so strong as before, and hence the dial wheels may be turned more easily and with less noise.

Figure 6:
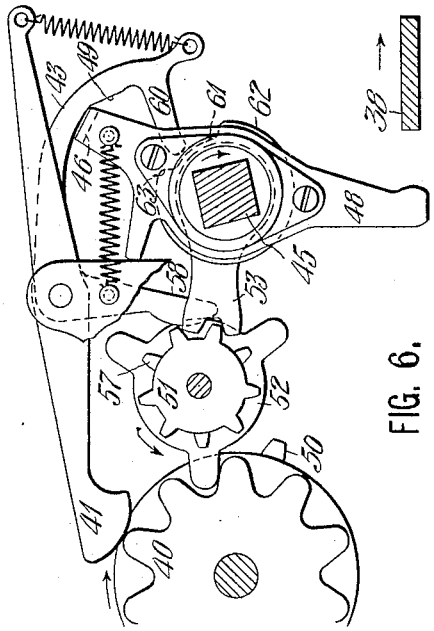
Fig. 6 is a view similar to Fig. 5, but showing the tens-carrying mechanism at one stage of its operation, before the detent is locked to prevent overthrow.
Figure 5:
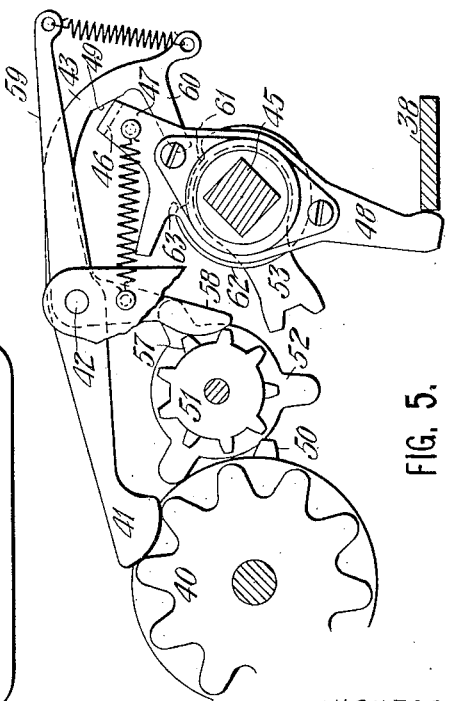
Fig. 5 is a view similar to Fig. 3, but showing the dial wheels locked at the completion of the forward stroke of the general operator.
Figure 8:
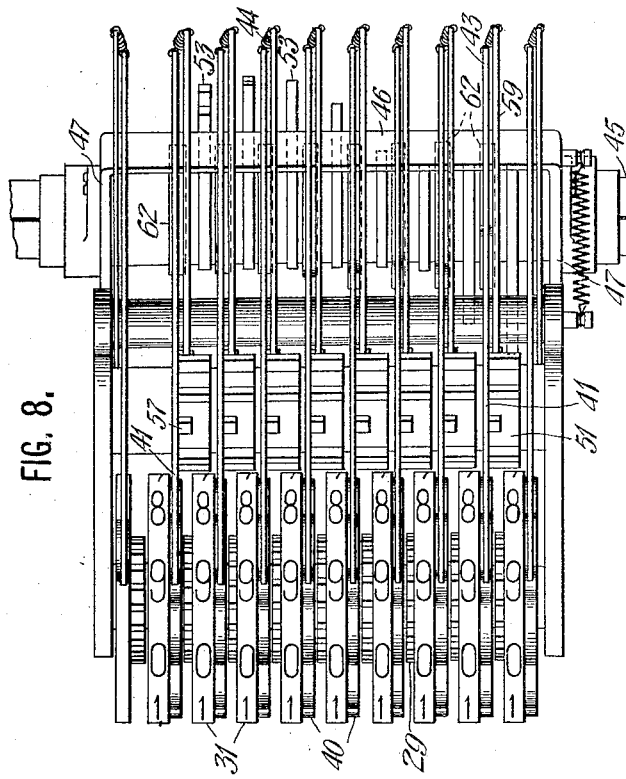
Fig. 8 is a plan of the mechanism seen at Fig. 3.

One feature of my improvements consists in the provision of means for positively locking the dial wheels 30 against overthrow. To this end, I hinge upon a horizontal shaft 45 which extends across the machine and is journaled at its ends in the opposite walls thereof, a bail, comprising a horizontal bar 46, Figs. 3 and 4, and opposite arms 47. This bail may rock independently of the shaft, being loosely hinged thereon. The bail is shown at Figs. 1 and 6 in normal position; and it will be seen that the detent 41 may ride over the teeth of the wheel 40 without interference from the bail bar 46; but during the final portion of the forward stroke of the general operator, the cross bar 38 thereof engages and swings forwardly a pair of arms 48, which are downward extensions of the arms 47 whereby the locking bail 46 is swung rearwardly to the position at Fig. 5, and engages the bottom edges of all of the detent arms 43; said edges being preferably formed with cams 49, so that the bar 46 may have a wedging action, and may complete its motion after engaging one or more of the cams, thereby insuring that all of the detent arms shall be brought under the control of this locking bar 46. There may be a little springing of the detent arms by the bar 46, to insure that the detents 41 shall positively lock wheels 40 against overthrow. The cam edges 49 may be shaped so that the bar 46 will slide along the cams, while the detents 41 are dropping into the notches of the wheels 40.

The gears 40 serve also as tens-carrying gears. The tens-carrying operation is initiated by special teeth 50, one of which is fixed upon each of the computing wheels 31, in position to engage and operate once in each revolution of wheel 31, an adjacent tens-carrying pinion 51, the latter provided with a three-toothed gear 52 in position to mesh with and turn the gear 40 fixed on the computing wheel 31 of next higher denomination. Although the tens-carrying operation depends upon the actuation of a pinion 51 by the tooth 50 upon the computing wheel 31, still such tooth merely initiates the tens-carrying operation, the latter being completed by means of one of a series of power-driven rocking segments 53. There is one segment 53 for each of the computing wheels except the units wheel; and these segments are fixed upon transverse horizontal shaft 45 which has at one end a pinion 54, the latter meshing with an idle pinion 55, which in turn meshes with the teeth on the left-hand slide 33 of the general operator, so that the pinion 54 is rotated forwardly and backwardly about a complete revolution at each cycle of movements of said general operator. The tens-carrying segments, however, are intended to rotate only in one direction; and hence the shaft 45 on which they are fixed is connected by a ball or other clutch 56 with said pinion 54, so that the rotation of the pinion during the advance of the operator is an idle one; the segment shaft 45 being turned only during the return stroke of the operator. In other words, during the forward stroke of the general operator, the teeth 50 on certain of the computing wheels 31 operate to set the tens-carrying pinions 51, and during the back stroke of the operator, the segments 53 engage the pinions 51 and complete the tens-carrying operations by giving one-tenth of a revolution each to the corresponding computing wheels 31. The tooth 50 on each wheel 31 imparts to the tens-carrying pinion 51 one-ninth of a revolution; there being nine teeth on said pinion; and each segment 53 is intended to turn its pinion one-sixth of a revolution; each pinion being thus turned one-third of a revolution in all, in order to rotate the gear 40 and the next wheel 31 one-tenth of a revolution.

Every third tooth on each tens-carrying pinion 51 is cut away, a portion 57 being left, however, sufficient to be engaged by a spring detent 58; the tooth being cut away so that the tens carrying segments 53 may swing idly past the tens-carrying pinions when the latter are idle; the gap between the teeth adjacent to the cut-away tooth being sufficient to permit the free movement of segment 53. The tooth 50 on any computing wheel 31, by moving the tens-carrying pinion 51 one-ninth of a revolution, turns said pinion into position for engagement by its associated segment 53 upon the next return movement of the general operator; whereby said pinion is advanced an additional one-sixth, and the wheel 31 of next higher denomination is turned one-tenth of a revolution. The segments 53 are arranged in spiral order on the shaft 45, so that tens-carrying may proceed from low to high denominations throughout the gang of computing wheels during a single return stroke of the general operator, whereby all the wheels may be turned from "9" to "0" progressively during said operator stroke. The detent 58 has an arm 59 to which the spring 44 is connected, to hold the detent in engagement with the teeth of pinion 51.

Figure 9:
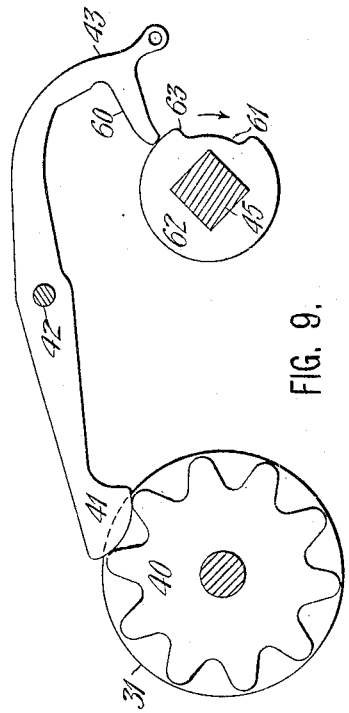
Fig. 9 is a view similar to Fig. 6, but showing the computing wheel locked at the conclusion of the operation of carrying tens thereon.

It is desired to lock the dial wheels against overthrow not only at the completion of the movement of the racks 27, but also at the completion of the tens-carrying operations; and to this end each of the detent arms 43, except that one which is associated with the units dial wheel, is provided with a tumbler 60, which normally overlies a recess 61 in a locking disk 62. These disks 62 are fixed at intervals along the shaft 45 to register with the detent arms 43. When any dial wheel is being rotated and the detent 41 vibrated, the tumbler 60 vibrates idly in the recess 61. When, during the return movement of the general operator 33, the shaft 45 is rotated far enough to enable the first segment 53 to operate the train for turning the tens dial wheel 31, the first locking disk 62, which is under the tumbler 60 that is associated with the tens dial wheel 31, has advanced far enough to carry the recess 61 past said tumbler 60, so that the latter, which is now in proximity to the uncut locking periphery of the disk 62, Fig. 9, is prevented from moving, and hence the detent 41 cannot rise from the notch of the wheel 40, and hence there can be no overthrow of the tens dial wheel 31 at the tens carrying operation.

Figure 7:
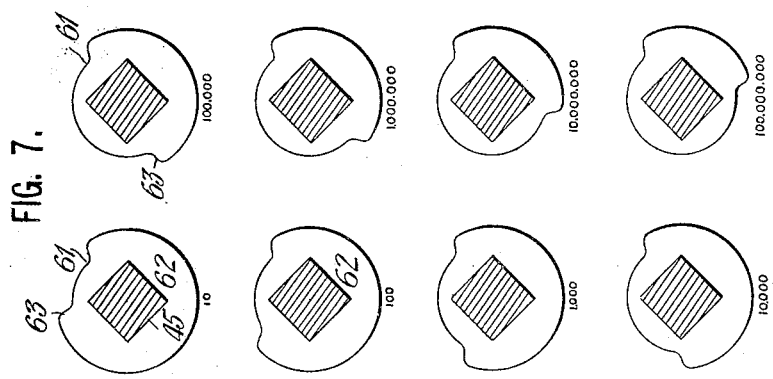
Fig. 7 is a series of diagrams to illustrate the forms of the detent locks provided upon the revoluble drive shaft of the tens-carrying mechanism.

The disks 62 are similar, except that the recess 61 is longer in the hundreds than in the tens locking disk 62, and is longer in the thousands than in the hundreds, and so on throughout the series, as seen at Fig. 7; this being occasioned because the tens carrying from the tens dial wheel to the hundreds dial wheel occurs after tens are carried from the units wheel, and so on; the dial wheel of highest denomination being the last one to be actuated by the tens-carrying train of mechanism, and the recess 61 being sufficiently long in each case to prevent vibration of the tumbler 60 and detent 41, except at the completion of the tens-carrying operation on the associated dial wheel 31. Each of the locking disks at Fig. 7 is marked to indicate its denomination.

The left hand or forward end of the recess is somewhat beveled as at 63, and the tip of the tumbler 60 may also be rounded, as shown, to enable the shaft 45 to cam the detent 41 into place, if desired. The parts 63 and 60 may be so shaped and positioned, that 60 will ride up on 63 as 41 descends into a notch in the wheel 40. So long as overthrow is prevented at the completion of a tens carrying operation of any dial wheel, it is unnecessary that the periphery of the locking disk 62 be prolonged as shown, for instance, at the upper left hand part of Fig. 7; the mere checking of the dial wheel at the moment of the completion of the tens-carrying action, being sufficient, although in some cases it may be desirable to keep the wheels of lower denomination locked until the last tens-carrying action is completed, and for this purpose the locking peripheries of the disk 62 may be made of full length, as at Fig. 7.

It will be seen that the dial wheels may be positively locked against overthrow, either when the racks 33 are operated, or when the tens-carrying mechanism is operated, or in both cases; and that in some cases the detents themselves may be weakened, so as to permit the dial wheels to be turned with greater ease and celerity, and less noise.

Variations may be resorted to within the scope of the invention, and portions of the improvements may be used without others.

Having thus described my invention, I claim:

1. The combination with computing wheels, means for turning them, and tens-carrying mechanism including a driving member common to all of said wheels, of means controlled by said driving member for engaging and locking all of the computing wheels against overthrow at every tens-carrying operation.

2. The combination with computing wheels, means for turning them, and a *seriatim* acting tens-carrying mechanism including a driving member, of individual yielding detents for said wheels, normally engaging the same, and means controlled by said driving member for successively rendering said detents unyielding to lock all of the computing wheels against overthrow at every tens-carrying operation.

3. The combination with computing wheels, means for turning them, and a tens-carrying mechanism including an intermittent driving member, of individual devices to engage said wheels, and means controlled by said driver for acting upon said individual devices in succession, to cause them to lock the wheels against overthrow at the tens-carrying operation.

4. The combination with computing wheels, means for turning them, and a tens-carrying mechanism including an intermittent driving member, of spring detents for said wheels, and means to enable said driver to prevent yielding of said detents at the completion of the tens-carrying operation, thereby to prevent overthrow of the wheels.

5. The combination with computing wheels, means for turning them, and a tens-carrying mechanism including an intermittently operating drive shaft, of devices normally ineffective to lock said wheels against overthrow, and members upon said shaft to render said locking devices effective.

6. The combination with computing wheels, means for turning them, and a tens-carrying mechanism including an intermittently operating drive shaft, of devices normally ineffective to lock said wheels against overthrow, and members upon said shaft to render said locking devices effective one after another.

7. The combination with computing wheels, means for turning them, and individual yielding detents for the computing wheels, of tens carrying mechanism including an intermittently operating shaft, and locking members on said shaft and movable thereby into position to intercept said detents, to lock the wheels against overthrow at the tens-carrying operation.

8. The combination with computing wheels, means for turning them, and individual yielding detents for the computing wheels, of tens carrying mechanism including an intermittently operating power shaft, and locking members on said power shaft and movable thereby into position to intercept said detents one after another, to lock the wheel against overthrow at the tens-carrying operation.

9. The combination with computing wheels, means for turning them, and a tens-carrying mechanism including an intermittent drive shaft, of spring detents for the computing wheels, tumblers associated with said detents, and locking members connected to said drive shaft to lock said tumblers and computing wheels at the completion of the tens-carrying operation.

10. The combination with computing wheels, means for turning them, and a tens-carrying mechanism including an intermittent drive shaft, of spring detents for the computing wheels, tumblers associated with said detents, and locking members connected to said drive shaft to lock said tumblers and computing wheels at the completion of the tens-carrying operation, said tens-carrying mechanism operating to affect the computing wheels *seriatim*, and said locking members effective to lock the wheels *seriatim*.

11. The combination with computing wheels, means for turning them, and a tens-carrying mechanism including an intermittent drive shaft, of spring detents for the computing wheels, tumblers associated with said detents, and locking members connected to said drive shaft to lock said tumblers and computing wheels at the completion of the tens-carrying operation, each locking member comprising a collar on the shaft having a locking periphery and provided with a depression normally opposite the tumbler.

12. The combination with computing wheels, means for turning them, and a tens-carrying mechanism including an intermittent drive shaft, of spring detents for the computing wheels, tumblers associated with said detents, and locking members connected to said drive shaft to lock said tumblers and computing wheels at the completion of the tens-carrying operation, each locking member comprising a collar on the shaft having a locking periphery and provided with a depression normally opposite the tumbler; the driving shaft being effective upon the computing wheels one after another, and the depressions being of correspondingly graduated sizes to cause the computing wheels to be locked *seriatim*.

13. In a computing machine, the combination with computing wheels, of means for rotating them, overthrow-preventing means rendered effective to prevent overthrow of all of said wheels at the end movement of the means for rotating them, a carry-over train for operating each wheel from the one below, and means for rendering said overthrow-preventing means effective to prevent overthrow of all of said wheels at every tens-carrying operation.

14. In a computing machine, the combination with numeral wheels, of overthrow-preventing means for each numeral wheel, means for carrying numbers into said numeral wheels rendering all said overthrow-preventing means effective simultaneously, and carry-over mechanism rendering all of said overthrow-preventing means effective successively.

15. The combination with computing wheels, a general operator for turning them concomitantly, and individual yielding detents for said wheels, of means controlled by the general operator to act upon said detents to cause them to lock the wheels against overthrow, a tens-carrying mechanism, and means controlled by said tens-carrying mechanism for also acting upon said detents to lock the wheels against overthrow.

16. The combination with computing wheels, of a general operator for turning them concomitantly, individual devices to engage said wheels, said devices movable independently of one another, means controlled by the general operator for acting upon said individual devices to cause them to restrain the wheels against overthrow, tens-carrying mechanism controlled by said general operator, and means associated with said tens-carrying mechanism for also acting upon said individual devices to cause them to restrain the wheels against overthrow at the tens-carrying operation.

17. The combination of computing wheels, spring detents therefor, a general operator for turning said wheels concomitantly, means to enable said general operator to prevent yielding of said detents at the completion of the rotation of the wheels, thereby to prevent overthrow of the latter, tens-carrying mechanism, and means connected to said tens-carrying mechanism for preventing yielding of said detents at the conclusion of the tens-carrying operation.

18. The combination with computing wheels and a general operator for turning the same concomitantly, of devices having arms, one device for each wheel, a bar extending along said arms, means to enable the general operator to move said bar to position to lock said devices and said computing wheels, tumblers upon said arms, a tens-carrying mechanism, and locks connected to the tens-carrying mechanism to intercept said tumblers and lock the wheels.

19. The combination with computing wheels and a general operator for turning the same concomitantly, of devices having arms, one device for each wheel, a bar extending along said arms, means to enable the general operator to move said bar to position to lock said devices and said computing wheels, tumblers upon said arms, a tens-carrying mechanism, and locks connected to the tens-carrying mechanism to intercept said tumblers and lock the wheels, said tens-carrying mechanism including a revoluble driving shaft and said locks being in the form of collars disposed along said drive shaft to register with said tumblers.

20. The combination with computing wheels and a general operator, of individual yielding detents for the computing wheels, a bar extending along said detents and normally out of the paths thereof, means to enable said general operator to move said bar into position to intercept said detents to prevent them from yielding and prevent overthrow of the wheels, tumblers upon said detents, a revoluble shaft, and collars upon said revoluble shaft to intercept said tumblers, said revoluble shaft forming part of a tens-carrying mechanism, and said collars having recesses which normally permit play of said tumblers and detents.

21. The combination with computing wheels, and a general operator, of individual yielding detents for the computing wheels, a bar extending along said detents and normally out of the paths thereof, means to enable said general operator to move said bar into position to intercept said detents to prevent them from yielding and prevent overthrow of the wheels, tumblers upon said detents, a revoluble shaft, and collars upon said revoluble shaft to intercept said tumblers, said revoluble shaft forming part of a tens-carrying mechanism, and said collars having recesses which normally permit play of said tumblers and detents; spirally disposed sectors being mounted on said shaft to perform the tens-carrying operation on said wheels in succession, and said collars having locking parts having a corresponding spiral arrangement.

22. The combination with a series of computing wheels, means for giving them initial rotation, and a tens-carrying mechanism, of normally ineffective locking means for said wheels, and a device for rendering the locking means effective upon all of the wheels simultaneously to lock them against overthrow at the initial operation of said wheels, said locking means also locking them against overthrow upon the completion of the tens-carrying operation.

23. The combination with a series of computing wheels, of individual yielding detents therefor, means for initially rotating said wheels, tens-carrying mechanism, and means for temporarily rendering all of said detents unyielding, both at the completion of the initial operation of said wheels and at the completion of the tens-carrying operation.

24. The combination with computing wheels and a reciprocating general operator for turning them upon its advance stroke, of means moved into position by the general operator at the conclusion of its advance stroke for locking the computing wheels against overthrow, said locking means released at the beginning of the return stroke of the general operator.

25. The combination with computing wheels and a reciprocating general operator for turning them upon its advance stroke, of means moved into position by the general operator at the conclusion of its advance stroke for locking the computing wheels against overthrow, said locking means released at the beginning of the return stroke of the general operator, tens-carrying mechanism, and means for relocking the computing wheels at the completion of the tens-carrying operation.

26. The combination with computing wheels and a reciprocating general operator for turning them upon its advance stroke, of means moved into position by the general operator at the conclusion of its advance stroke for locking the computing wheels against overthrow, said locking means released at the beginning of the return stroke of the general operator, tens-carrying mechanism, said tens-carrying mechanism including devices for operating the computing wheels in succession, and means for relocking the computing wheels successively at the conclusion of each tens-carrying movement thereof.

27. In a computing machine, the combination with computing wheels, of computation members in which numbers are temporarily set up, a general operator arranged to carry into said wheels the numbers set up, a bar on said general operator arranged to intercept said computation members for thus carrying numbers, a detent for each computing wheel normally yieldingly engaging the same arranged to be positively locked against its wheel by the final movement of said bar, carry-over devices for said wheels set on the first stroke of said general operator, means for causing said carry-over devices to successively operate the computing wheels, and means for causing each detent to lock its computing wheel after the carry-over device has turned said wheel.

28. In a computing machine, the combination with computing wheels, of computation members in which numbers are temporarily set up, a general operator arranged to intercept said computation members so as to carry the set-up numbers into said wheels and arranged to complete said carrying on all said members at the same moment, a bar on said general operator for so intercepting said members, a detent for each computing wheel normally yieldingly engaging the same and arranged to be made effective to positively lock its wheel by said bar, carry-over devices for said computing wheels arranged to be successively operated by another part of said general operator, and an extension on each of said detents arranged to be struck by said other part to render them effective to positively arrest said computing wheels after the operation of the carry-over devices.

29. In a computing machine, the combination with computing and carry-over wheels normally disconnected, of separate detents for each wheel of each kind, a single spring for the detent of a computing wheel and the detent of its carry-over wheel, and means for positively locking each computing wheel by its detent, while leaving said spring effective to control said carry-over wheel detent.

30. In a computing machine, the combination with numeral keys and computing wheels, of means for turning said computing wheels simultaneously to an extent determined by the numeral keys operated, means for simultaneously locking all said wheels, carry-over wheels operating *seriatim* to turn said computing wheels, and means for locking said computing wheels *seriatim* whether turned or not by said carry-over wheels.

31. In a computing machine, the combination with numeral wheels and carry-over devices therefor, of a shaft comprising spirally arranged driving members for said carry-over devices, and spirally arranged members on said shaft effective on said wheels for preventing excessive operation of said numeral wheels by said carry-over devices.

32. In a computing machine, the combination with computing wheels and carry-over wheels, of a shaft comprising spirally arranged driving members for said carry-over wheels, means for moving said carry-over wheels by said computing wheels to positions where said driving members will be effective on them, detents for holding said carry-over wheels thus effective, and spirally arranged members on said shaft effective on said computing wheels for preventing excessive operation of said computing wheels by said driving members.

33. In a computing machine, the combination with computing wheels and carry-over wheels, of rack bars for driving said computing wheels, a reciprocating general operator for driving said rack bars, detents for said computing wheels, a locking device to cause said detents to lock said wheels and driven by said operator, a shaft driven with said operator to drive said carry-over wheels, spirally arranged members on said shaft by which it so drives said carry-over wheels, and spirally arranged locking members on said shaft to lock said computing wheels by said detents.

34. In a computing machine, the combination with computing wheels and carry-over wheels, of computation members for driving said computing wheels, a general operator for driving said computation members to turn said computing wheels, a detent for each computing wheel, a locking device to cause a detent to lock said wheels at the moment they have been completely turned by said operator, said locking device moved by said operator, a shaft driven after said operator has so completely turned the computing wheels to drive said carry-over wheels, spirally arranged members on said shaft by which it so drives said carry-over wheels, and spirally arranged locking members on said shaft to lock said computing wheels by said detents.

35. In a computing machine, the combination with computing wheels and carry-over wheels, of computation members for driving said computing wheels, so that all the computing wheels finish turning at the same moment, a general operator for driving said members to so turn said wheels, a detent for each computing wheel, means effective at the moment when said turning of the computing wheels is completed to lock said detents against said wheels, a shaft driven after said wheels have thus been locked to drive said carry-over wheels, spirally arranged members on said shaft by which it so drives said carry-over wheels, and spirally arranged locking members on said shaft to lock said computing wheels by said detents.

36. In a computing machine, the combination with computing wheels, of a carry-over drive shaft, a device journaled on said shaft for locking said wheels against overthrow in the computing operation, and devices fast on said shaft for locking said wheels against overthrow in the carry-over operation.

FREDERICK A. HART.

Witnesses:
 GLENFIELD S. YOUNG,
 C. RIPLEY.

Copies of this patent may be obtained for five cents each, by addressing the "Commissioner of Patents, Washington, D. C."